No. 668,359. Patented Feb. 19, 1901.
A. L. STEVENS.
ELECTRIC BATTERY CONTACT.
(Application filed July 26, 1900.)
(No Model.) 2 Sheets—Sheet 1.
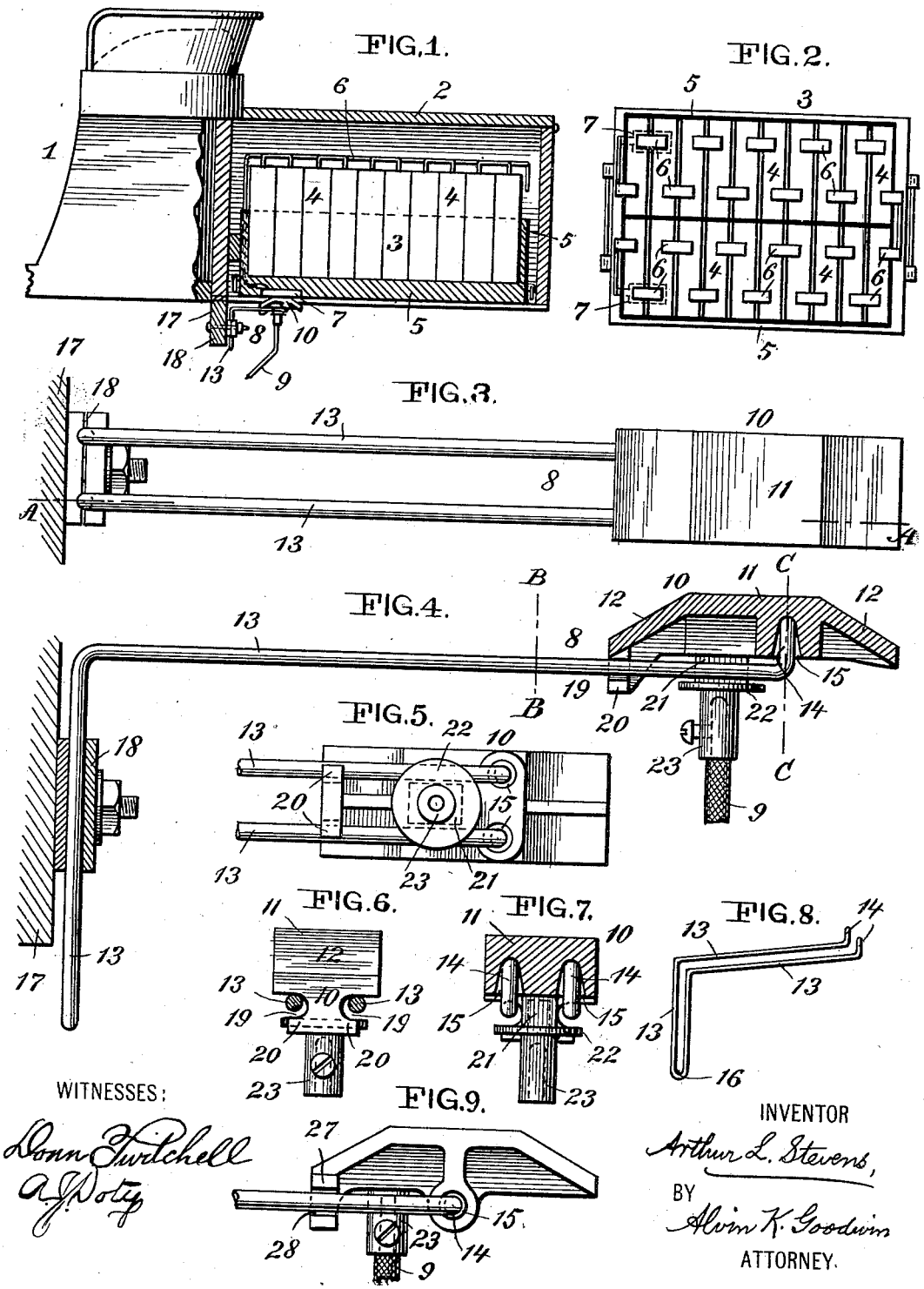
WITNESSES:
Donn Twitchell
A. J. Doty
INVENTOR
Arthur L. Stevens,
BY
Alvin K. Goodwin
ATTORNEY.

No. 668,359. Patented Feb. 19, 1901.
A. L. STEVENS.
ELECTRIC BATTERY CONTACT.
(Application filed July 26, 1900.)
(No Model.)
2 Sheets—Sheet 2.

WITNESSES:
Donn Twitchell
A. J. Doty

INVENTOR
Arthur L. Stevens,
BY Alvin K. Goodwin,
ATTORNEYS

UNITED STATES PATENT OFFICE.

ARTHUR L. STEVENS, OF NEW YORK, N. Y.

ELECTRIC-BATTERY CONTACT.

SPECIFICATION forming part of Letters Patent No. 668,359, dated February 19, 1901.

Application filed July 26, 1900. Serial No. 24,923. (No model.)

*To all whom it may concern:*

Be it known that I, ARTHUR L. STEVENS, a citizen of the United States of America, residing at the borough of Manhattan, city of New York, State of New York, have invented certain new and useful Improvements in Electric-Battery Contacts, of which the following is a specification.

This invention relates to contacts for electric batteries, and more particularly those used on automobile vehicles to connect the storage battery and motor of the vehicle in circuit through the medium of the ordinary current-controller.

The invention has for its main object to provide electric contacts so constructed and combined with the body of a vehicle, its battery, and the motor as to make self-adjusting and reliable circuit connection of the motor with the source of electric energy, while permitting most convenient inspection, cleaning, or repairs of the opposing battery-terminals and motor lead-contacts at any time or place and without opening the battery-compartment of the vehicle or withdrawing or disturbing the battery itself.

The invention will first be described and then will be particularly defined in the claims hereinafter set forth.

Reference is made to the accompanying drawings, forming part of this specification, and in which—

Figure 10:
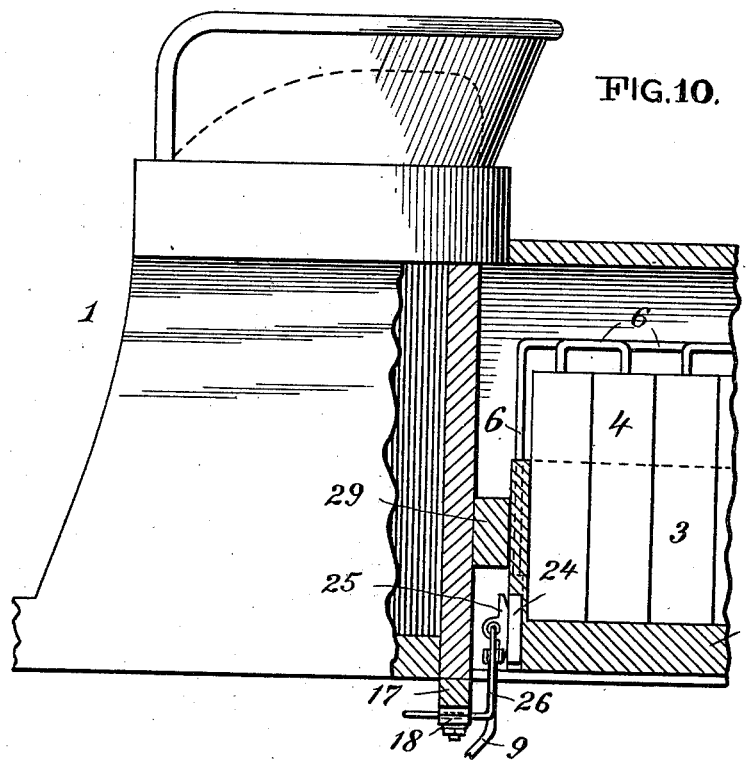
Figure 11:
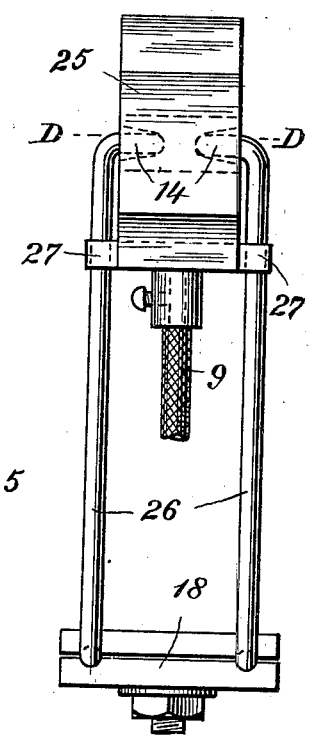
Figure 13:
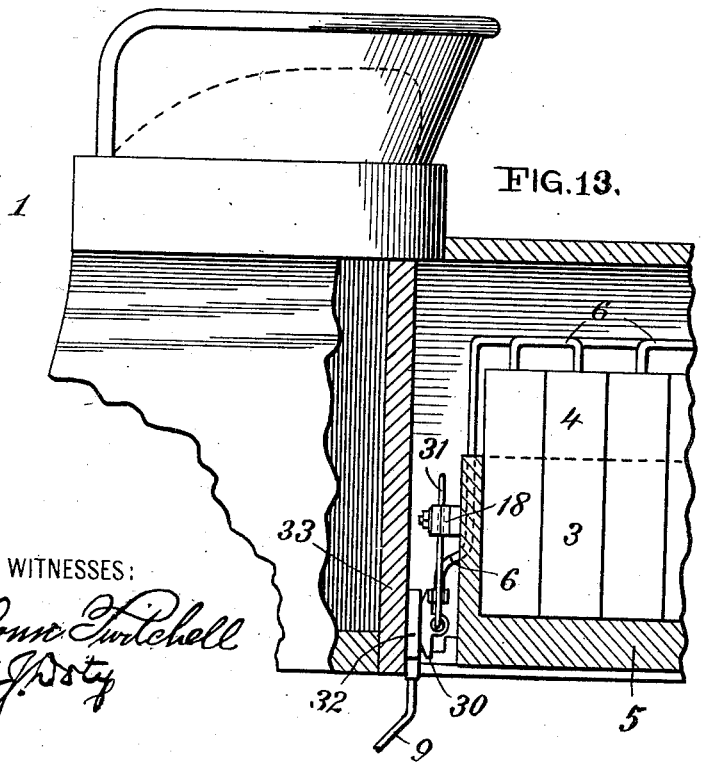
Figure 12:
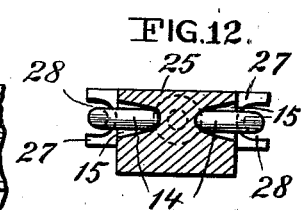

Figure 1 is a sectional side elevation of part of a vehicle-body with its storage battery and the battery-terminals and motor lead-contacts in a preferred operative relation. Fig. 2 is a plan view of the storage battery, showing its plate connections and terminals. Fig. 3 is a plan view of one preferred form of motor lead-contact. Fig. 4 is a side elevation of said contact, partly broken away and in vertical longitudinal section on line A A in Fig. 3. Fig. 5 is a bottom plan view of the head-plate portion of the lead-contact. Fig. 6 is a front view with the elastic contact-support in vertical section on line B B in Fig. 4. Fig. 7 is a rear end view, in vertical section, on line C C in Fig. 4. Fig. 8 is a reduced perspective view of the support of the motor lead-contact. Fig. 9 is a side elevation of a motor contact-plate of modified form and part of its elastic support, Figs. 3 to 9 being nearly full size. Fig. 10 is a detail sectional side elevation illustrating one modified arrangement of the battery-terminals and motor lead-contacts. Fig. 11 is a front or face view of this modified lead-contact and its clamp. Fig. 12 is a detail plan view in section on line D D in Fig. 11; and Fig. 13 is a sectional side elevation showing another modification, wherein yielding terminals at the lower part of the battery-box oppose fixed motor lead-contacts on the vehicle-body.

The electric-battery terminals and motor lead-contacts of an automobile vehicle often are arranged at the sides of the battery-box, where full access cannot conveniently be had to them for cleaning, adjustment, or repairs without shifting or removing the battery. In my apparatus these terminals and lead-contacts are located at the bottom or lower part of the battery-box, where they always are readily accessible from outside the vehicle-body.

I first will describe a preferred construction, (shown in Figs. 1 to 8, inclusive, of the drawings,) as follows: The numeral 1 indicates a vehicle-body having a compartment 2, containing a battery or other source of electric energy. As shown, the battery 3 is a storage battery having cells 4 held in a portable box 5. Wires 6 suitably couple the cell plates or electrodes with two or more battery-terminals 7, which, as herein shown, are located directly at and about flush with the outside bottom face of the battery-box and at the inner part of said box.

Motor lead-contacts (generally marked 8 in the drawings) oppose the battery-terminals 7 and convey current between the battery and motor-controller (not shown) by wires or leads 9. The contact-plate 10 preferably has a flat central-acting face 11 and sloping end faces 12 12, permitting unobstructed sliding of the battery-box terminals over the motor lead-contacts. The yielding support for head-plate 10 is an elastic arm which preferably comprises two parallel metal wires 13, having bent ends 14, entering tapering-holes 15 in the outer or under side of the plate. The elastic support preferably has the general right-angular form shown in Figs. 1, 4, and 8 of the drawings, and the lower ends of its parallel bent wires 13 are preferably connected by a cross-piece 16 of the wire. Thus making the support of a single piece of wire assures the best elastic holding effect relatively to the vehicle-body 1, the contact-plate 10, and the opposing battery-terminal 7. As herein shown, the upright portion of the support is fastened to a wood cleat 17 on the vehicle-body by a suitable clamp 18. An interposed insulating-block will be used when the clamp is fastened to a metal part of the vehicle. The two elastic arms 13 enter recesses 19, formed in the inner end portion of the plate 10 above lateral lips 20. Recesses 19 are larger than the diameter of arms 13, and thus permit free play or universal rocking both vertically and laterally of the contact-plate 10, this rocking also being permitted by the tapering holes 15, receiving the bends 14 of the arms 13.

It will be understood that in adjusting contact-plate 10 to the battery-terminal 7 the elastic support 13 will be held sufficiently far upward in and by the clamp 18 to cause surface 11 of plate 10 to stand above the normal line of contact with terminal 7 (shown in Fig. 1 of the drawings) when the battery is removed and that as plate 10 is pressed down to this normal line of contact by battery-terminal 7 riding over it the tension of yielding elastic arms 13 is increased to cause them to exert constant and considerable pressure on contact-plate 10 to hold it always close to the opposing battery-terminal 7. The universal rocking of contact-plate 10 on its elastic support 13 allows the plate automatically to find and maintain a true and perfect bearing for its whole face area 11 against the battery-terminal 7 to give the most effective conductivity between them. The support 13 may at any time be bodily adjusted in clamp 18 to maintain any desired degree of pressure of plate 10 upon the opposing battery-terminal 7.

The support-arms 13 pass one at each side of a lug 21, formed at the bottom of contact-plate 10. I also prefer to use an auxiliary arm-retaining washer 22, which is held against lug 21 by the shouldered and threaded inner end of a stud 23, to which stud the wire or lead 9 is connected. The arm 13 may be sprung apart to pass them over lips 20 into the lateral plate-recesses 19 as the arm-bends 14 are entered into plate-openings 15, and the retainer 22 then is applied and is fastened by screwing the shouldered end of the stud 23 into the lug 21, as shown in the drawings.

As thus far described, the battery-terminals are arranged directly at the outside bottom face of the battery-box and in opposition to the horizontal motor lead-contacts; but within the scope of my invention these terminals and contacts may be located at any lower part of the box, provided they be accessible for inspection, adjustment, cleaning, or repairs from outside the vehicle-body and without withdrawing the battery. Such an arrangement is shown in Fig. 10 of the drawings, wherein the battery-terminals 24 stand vertically and are let in flush with the lower portion of the inner end of the battery-box 5. In this case the vertical opposing motor-contact head-plate 25 is sustained by an angular support 26, which is preferably elastic and is held adjustably by a clamp 18 to a cross-bar 17 on the vehicle-body. This head-plate 25 has tapering recesses 15 at opposite sides, which receive laterally-bent ends 14 of the support 26 and permit universal adjustment of plate 25 to the opposing terminal 24, substantially like the head-plate 10 above described. By bodily adjusting support 26 in clamp 18 any desired degree of pressure of contact 25 on the relatively-fixed terminal 24 may be maintained. In this construction the motor-lead 9, connected to head-plate 25, would hold said plate from turning bodily on parts 14; but I prefer to retain the head-plate in approximately operative position by providing it at one end with lugs 27, having openings 28, through which the arms of the support pass. These openings are larger than the diameter of said arms and, like the openings 19 hereinbefore described, do not interfere with universal self-adjustment of the head-plate on its support relatively to the opposing battery-terminal. A block 29 at the inner end of the battery-compartment of the vehicle-body prevents jamming of the motor lead-contact 25 by limiting forward movement of the battery-box.

It is not essential that the battery-box terminals be fixed and the motor lead-contacts be adjustable, as the alternate arrangement of yielding box-terminals and fixed motor lead-contacts may be adopted within the scope of my invention. This modified construction is shown in Fig. 13 of the drawings, wherein universally-adjustable terminals in the form of head-plates 30, like the ones 25, are sustained on straight elastic supports 31, having laterally-bent ends like the angular supports 26 and held by clamps 18 to the inner end of the battery-box 5. The battery-wires 6 are coupled directly to these yielding box-terminals, and the contacts 32, to which the motor-leads 9 are connected, are fixed to an adjacent portion 33 of the vehicle-body. It is obvious that these accessible opposing terminals and contacts 30 32 may be arranged at the outside bottom face of the battery-box.

In Fig. 9 of the drawings is shown a horizontal motor lead-contact having a bottom stud 23 for connecting the lead 9 and having inwardly-tapering openings 15 in its opposite sides, receiving the laterally-bent ends of an elastic support, and also having lugs 27, with openings 28, freely receiving the sides of the elastic support, substantially like the contact head-plate 25 and yielding box-terminal 30, above described.

In all constructions of the opposing battery-terminals and motor lead-contacts herein shown there is a universal self-adjustment of the opposing faces of the terminals and contacts relatively to each other, which assures full measure of conductivity between them.

As the arrangement of yielding terminals 30 on the battery-box somewhat exposes said terminals to injury during handling of the heavy storage battery, either construction of Fig. 1 or Fig. 10 is preferable, as there is little or no danger of injuring the fixed battery-terminal 7 or 24 by placing the battery in or removing it from the vehicle.

It is obvious that battery-terminals and motor lead-contacts arranged substantially as herein described always are accessible from outside the vehicle-body for inspection, cleaning, adjustment, or repairs and without requiring opening of the battery-compartment of the vehicle-body or withdrawing or in any way disturbing the battery itself. It requires but a few moments for the motorman to pass a sheet of sandpaper or emery-cloth between the battery-terminals and motor lead-contacts to perfectly clean their opposing faces for assuring maximum conductivity at all times, and thus promote full efficiency of the battery and motor. There is no danger of the self-adjusting terminal contact head-plate being shaken out or lost from its support by jolting of the vehicle. Furthermore, the current passes directly through the motor lead-contact head-plate 10 or 25 or battery-terminal 30 and the corresponding lead 9 or 6, and not through the support 13, 26, or 31 of said parts, and therefore the elastic effectiveness and durability of said support are not impaired by overheating, which occurs with other contact devices in which the current traverses an elastic support of a conductive head-plate or terminal.

I claim as my invention—

1. Electric-battery terminal and motor lead-contacts connecting a vehicle battery and motor in circuit and accessible from outside the vehicle-body.

2. Electric-battery terminal and motor lead-contacts connecting a vehicle battery and motor in circuit and accessible from outside the vehicle-body without requiring withdrawal or removal of the battery.

3. Electric-battery contacts connecting a vehicle battery and motor in circuit and comprising opposing terminals and lead-contacts accessible at the lower portion of the battery-box and having universal self-adjustment at their opposing faces relatively to each other.

4. Electric-battery contacts connecting a vehicle battery and motor in circuit and comprising terminals at the lower portion of the battery-box and motor lead-contacts opposing the terminals; all of said contacts being accessible from below or outside of the vehicle-body.

5. Electric-battery contacts connecting a vehicle battery and motor in circuit and comprising terminals at the lower portion of the battery-box, and universally-movable motor lead-contact plates sustained in opposition to said terminals.

6. Electric-battery contacts connecting a vehicle battery and motor in circuit and comprising terminals exposed at the bottom face of the battery-box, and universally-movable lead-contact plates sustained in opposition to said terminals.

7. In electric batteries for vehicles, the battery-terminals arranged at the lower part of the battery-box, combined with cells in the box, wires coupling the cell-electrodes to each other and to the terminals, and universally-movable lead-contact plates sustained in opposition to the terminals; all of said terminal and lead contacts being accessible from outside the vehicle-body.

8. A battery lead-contact comprising an elastic support and a head-plate sustained thereon and having means for connecting the lead, thereby preventing passage of current through the support and preserving its elasticity.

9. A battery lead-contact comprising an elastic support and a head-plate sustained thereon for universal self-adjusting movement.

10. A battery lead-contact comprising an elastic support and a head-plate sustained thereon for universal self-adjusting movement and having means for connecting the lead.

11. A battery lead-contact comprising a support formed with two arms having bent ends, and a head-plate having tapering openings receiving said ends and other openings freely receiving body portions of the arms, whereby the plate has substantially universal movement for self-adjustment to an opposing terminal or contact-plate and is retained in approximately operative position.

12. A battery lead-contact comprising a support having two arms formed with bent ends, and a head-plate having tapering recesses receiving the bent ends of the arms and also having lateral openings into which the support-arms freely pass; said head-plate being adapted for connection of the leading-wire.

13. A battery lead-contact comprising a support formed in one piece and having two angular elastic arms provided with bent ends, and a head-plate having tapering recesses receiving the bent ends of the arms, and also having lateral openings into which the elastic arms freely pass; said head-plate being adapted for connection of the leading-wire.

14. A battery lead-contact comprising a support formed in one piece and having two elastic arms provided with bent ends 14, and a head-plate having acting face 11, tapering recesses 15 receiving parts 14, and lateral openings 19, and adapted for connection of the leading-wire.

15. A battery lead-contact comprising a support having two elastic arms formed with bent ends 14, and a head-plate having acting face 11, tapering recesses 15 receiving parts 14, lateral openings 19, a lug 21, a retainer 22, and lead-coupling stud 23, substantially as described.

16. A battery lead-contact comprising a support formed in one piece having two angular elastic arms provided with bent ends 14, and a head-plate having acting face 11, tapering recesses 15 receiving parts 14, lateral openings 19, lips 20, a retainer 22, and lead-coupling stud 23, substantially as described.

ARTHUR L. STEVENS.

Witnesses:
  A. J. DOTY,
  A. F. MADDEN.